(12) United States Patent
Youn et al.

(10) Patent No.: US 10,349,256 B2
(45) Date of Patent: Jul. 9, 2019

(54) METHOD FOR REQUESTING EMERGENCY SERVICE BY ROAMING UE AND METHOD FOR PROCESSING SAME

(71) Applicant: LG ELECTRONICS INC., Seoul (KR)

(72) Inventors: Myungjune Youn, Seoul (KR); Jinsook Ryu, Seoul (KR); Hyunsook Kim, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/747,853

(22) PCT Filed: Aug. 16, 2016

(86) PCT No.: PCT/KR2016/008988
§ 371 (c)(1),
(2) Date: Jan. 26, 2018

(87) PCT Pub. No.: WO2017/030347
PCT Pub. Date: Feb. 23, 2017

(65) Prior Publication Data
US 2018/0213384 A1 Jul. 26, 2018

Related U.S. Application Data

(60) Provisional application No. 62/207,358, filed on Aug. 19, 2015.

(51) Int. Cl.
*H04W 4/90* (2018.01)
*H04W 8/06* (2009.01)
(Continued)

(52) U.S. Cl.
CPC ........... *H04W 4/90* (2018.02); *H04L 65/1006* (2013.01); *H04L 65/1016* (2013.01);
(Continued)

(58) Field of Classification Search
CPC ......... H04W 60/00; H04W 4/90; H04W 8/20; H04W 8/06; H04W 8/12; H04L 65/1073; H04L 65/1006; H04L 65/1016
See application file for complete search history.

(56) References Cited

U.S. PATENT DOCUMENTS

| | | |
|---|---|---|
| 2011/0275342 A1 | 11/2011 | Ramle et al. |
| 2014/0372546 A1 | 12/2014 | Belling et al. |

(Continued)

OTHER PUBLICATIONS

ETSI TS 123 003 V9.14.0 (Mar. 2014), Technical Specification, Digital cellular telecommunications system (Phase 2+); Universal Mobile Telecommunications System (UMTS); Numbering, addressing and identification (3GPP TS 23.003 version 9.14.0 Release 9), 82 pgs.

(Continued)

Primary Examiner — Marcos L Torres
(74) Attorney, Agent, or Firm — Birch, Stewart, Kolasch & Birch, LLP

(57) ABSTRACT

An embodiment of the present description provides, in a situation in which, when a user equipment (UE) is roaming in a visited network, i.e. V-PLMN, the roaming is processed by means of a home routed (HR) mode and is successfully registered to H-PLMN IMS and a service is received, a method for performing authentication/registration of a UE, which is to receive an emergency service, if IMS-NNI does not exist between H-PLMN and V-PLMN.

11 Claims, 11 Drawing Sheets

(51) Int. Cl.
*H04W 8/12* (2009.01)
*H04L 29/06* (2006.01)
*H04W 60/00* (2009.01)
*H04W 8/26* (2009.01)

(52) U.S. Cl.
CPC .......... *H04L 65/1073* (2013.01); *H04W 8/06* (2013.01); *H04W 8/12* (2013.01); *H04W 8/26* (2013.01); *H04W 60/00* (2013.01)

(56) References Cited

U.S. PATENT DOCUMENTS

| | | |
|---|---|---|
| 2014/0376414 A1 | 12/2014 | Edge et al. |
| 2015/0055554 A1 | 2/2015 | Sedlacek et al. |
| 2017/0019803 A1* | 1/2017 | Nguyen ................ H04W 76/10 |
| 2017/0156043 A1* | 6/2017 | Li ............................ H04W 4/90 |
| 2018/0063688 A1* | 3/2018 | Lindholm ............... H04W 4/90 |

OTHER PUBLICATIONS

NTT DOCOMO et al., "Key Issue: How to authenticate the UE and perform IMS emergency registration", S2-152660, SA WG2 Meeting #110, Dubrovnik, Croatia, Jul. 6-10, 2015, 5 pgs.

* cited by examiner

METHOD FOR REQUESTING EMERGENCY SERVICE BY ROAMING UE AND METHOD FOR PROCESSING SAME

CROSS REFERENCE TO RELATED APPLICATIONS

This application is the National Phase of PCT International Application No. PCT/KR2016/008988, filed on Aug. 16, 2016, which claims priority under 35 U.S.C. 119(e) to U.S. Provisional Application No. 62/207,358, filed on Aug. 19, 2015, all of which are hereby expressly incorporated by reference into the present application.

BACKGROUND OF THE INVENTION

Field of the Invention
The present invention relates to mobile communication.
Related Art
In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

An Evolved Packet Core (EPC) may include various elements. FIG. 1 illustrates a Serving Gateway (S-GW) 52, a Packet Data Network Gateway (PDN GW) 53, a Mobility Management Entity (MME) 51, a Serving General Packet Radio Service (GPRS) Supporting Node (SGSN), and an enhanced Packet Data Gateway (ePDG) that correspond to some of the various elements.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

The SGSN handles all packet data, such as a user's mobility management and authentication for different access 3GPP networks (e.g., a GPRS network and an UTRAN/GERAN).

The ePDG plays a role of a security node for an unreliable non-3GPP network (e.g., an I-WLAN and a Wi-Fi hotspot).

As described with reference to FIG. 1, a terminal (or UE) having an IP capability can access an IP service network (e.g., IMS), provided by a service provider (i.e., an operator), via various elements within an EPC based on non-3GPP access as well as based on 3GPP access.

Furthermore, FIG. 1 shows various reference points (e.g., S1-U and S1-MME). In a 3GPP system, a conceptual link that connects two functions that are present in the different function entities of an E-UTRAN and an EPC is called a reference point. Table 1 below defines reference points shown in FIG. 1. In addition to the reference points shown in the example of Table 1, various reference points may be present depending on a network configuration.

TABLE 1

| REFERENCE POINT | DESCRIPTION |
| --- | --- |
| S1-MME | A reference point for a control plane protocol between the E-UTRAN and the MME |
| S1-U | A reference point between the E-UTRAN and the S-GW for path switching between eNodeBs during handover and user plane tunneling per bearer |
| S3 | A reference point between the MME and the SGSN that provides the exchange of pieces of user and bearer information for mobility between 3GPP access networks in idle and/or activation state. This reference point can be used intra-PLMN or inter-PLMN (e.g. in the case of Inter-PLMN HO). |
| S4 | A reference point between the SGW and the SGSN that provides related control and mobility support between the 3GPP anchor functions of a GPRS core and the S-GW. Furthermore, if a direct tunnel is not established, the reference point provides user plane tunneling. |

TABLE 1-continued

| REFERENCE POINT | DESCRIPTION |
|---|---|
| S5 | A reference point that provides user plane tunneling and tunnel management between the S-GW and the PDN GW. The reference point is used for S-GW relocation due to UE mobility and if the S-GW needs to connect to a non-collocated PDN GW for required PDN connectivity |
| S11 | A reference point between the MME and the S-GW |
| SGi | A reference point between the PDN GW and the PDN. The PDN may be a public or private PDN external to an operator or may be an intra-operator PDN, e.g., for the providing of IMS services. This reference point corresponds to Gi for 3GPP access. |

Among the reference points shown in FIG. 1, S2a and S2b correspond to non-3GPP interfaces. S2a is a reference point providing the user plane with related control and mobility support between a PDN GW and a reliable non-3GPP access. S2b is a reference point providing the user plane with mobility support and related control between a PDN GW and an ePDG.

FIG. 2 is an exemplary diagram showing the architecture of a common E-UT RAN and a common EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the sender side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are present in the physical layer of the sender side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first OFDM symbol of a subframe carries a Control Format Indicator (CFI) regarding the number of OFDM symbols (i.e., the size of a control region) used to send control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel. A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are present in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for sending, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently send an IP packet, such as IPv4 or IPv6, in a radio section having a small bandwidth when sending the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is present between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

FIG. 6 illustrates a connection between an EPC and an IP Multimedia Subsystem (IMS).

Referring to FIG. 6, a MME 51, a S-GW 52, a P-GW 53a being connected to an IMS, a P-GW 53b being connected to the Internet, a Policy and Charging Rule Function (PCRF) 58 being connected to the P-GW 53b, and a traffic detection function (TDF) 59 being connected to the PCRF 58 are indicated in an EPC.

The TDF 59 performs detection of an application and reports description information on the detected application and a service data flow of the corresponding application to the PCRF 58. The TDF 59 supports solicited application report and/or unsolicited application report.

The IMS corresponds to a network technology that allows Packet Switching (PS) to be performed in wired terminals as well as wireless terminals based on an Internet Protocol (IP). The IMS was proposed to connect both wired and wireless terminals through the IP (All-IP).

Such network that is based on IMS includes a Call Session Control Function (CSCF) and Interconnection Border Control Functions (IBCF) 62 for performing control signaling, registration, and procedures for sessions. The CSCF may include a Proxy-CSCF (P-CSCF) 61 and a Serving-CSCF (S-CSCF) 63. Additionally, the CSCF may also include an Interrogating-CSCF (I-CSCF). The P-CSCF 61 operates as a first access point for a user equipment (UE) within an IMS-based network. And, the S-CSCF 63 processes a session within the IMS network. More specifically, as an entity that performs the function of routing signaling, the S-CSCF 63 performs routing of a session in the IMS network. And, the I-CSCF operates as an access point with another entity within the IMS network.

In the above-described IMS, an IP-based session is controlled by a session initiation protocol (SIP). As a protocol for controlling sessions, the SIP refers to a signaling protocol specifying a procedure that allows terminals that wish to perform communication to identify one another and to find (or locate) their positions, to generate a multimedia service session between one another, or to delete and/or change the generated session. By using a Uniform Resource Identifier (SIP URI) that is similar to an e-mail address in order to identify each user, the SIP may provide services without being subordinate to the Internet Protocol (IP) address. Although such SIP message corresponds to a control message, the above-described SIP message is transmitted between a UE and an IMS network through an EPC user plane.

Referring to FIG. 6, a first P-GW 53a of the EPC is connected to the P-CSCF 61 of the IMS, and the P-CSCF 61 is connected to the IBCF 62, and the IBCF 62 is connected to the S-CSCF 63.

Furthermore, a second P-GW 53b of the EPC is connected to a network of an internet service provider.

FIG. 7 illustrates an exemplary diagram showing a roaming method of voice over LTE (VoLTE).

As shown in FIG. 7, the roaming methods of VoLTE include a Home Routed (HR) method and a Local Breakout (LBO) method.

According to the LBP method, IMS signaling that is transmitted from a UE passes through the S-GW/P-GW/P-CSCF, which exist in a Visited Public Land Mobile Network (V-PLMN), and is then delivered (or transported) to an S-CSCF existing in a Home PLMN (H-PLMN).

According to the HR method, the signaling passes through the S-GW, which exists in the V-PLMN, reaches the P-GW/P-CSCF existing in the H-PLMN, and then delivered (or transported) to an S-CSCF.

FIG. 8 is an exemplary signal flow chart showing a UE performing IMS registration by using a Home Routed (HR) method while the UE is roamed to a visited network.

As shown in FIG. 8, a UE 100 is in a state of being roamed to a visited network.

First, the UE 10 being located in the visited network passes through an S-GW 52b existing in the visited network and generates an IMS PDN with a P-GW existing in a home network. Herein, the IMS PDN may correspond to a PDN for an IMS service, a PDN of a Well-known IMS APN, a PDN for a Voice over LTE service, and so on.

1) Subsequently, when the UE 10 transmits an SIP-based REGISTER message to the S-GW 52b existing in the visited network in order to perform IMS registration, the S-GW 52b existing in the visited network delivers the message to a P-CSCF 61a existing in the home network.

2) The P-CSCF 61a delivers the message to an I-CSCF 64a.

3)~4) The I-CSCF 64a acquires user information from an HSS 54a existing in the home network.

5) Then, the I-CSCF 64a transmits the SIP-based REGISTER message to an S-CSCF 63a.

6)~7) The S-CSCF 63a acquires user information from the HSS.

8) Thereafter, the S-CSCF 63a performs service control for the registration of the UE.

9)~11) If the registration of the UE is successful, the S-CSCF 63a transmits a 200 OK message.

Meanwhile, in order to allow the UE 10 to request an emergency service, a new emergency PDN should be generated instead of the existing IMS PDN.

Also, since the processing of an emergency service should be performed in the visited network wherein the UE exists, i.e., in the V-PLMN, the emergency PDN should be generated through the P-GW of the V-PLMN. This is because, in case the UE requests an emergency call, the emergency call should be delivered to the local authorities (e.g., fire department, police station, and so on) where the UE is located.

As described above, even if the emergency PDN is generated through the P-GW of the V-PLMN, in case a Network to Network Interface (NNI) fails to be generated between a H-PLMN IMS network and a V-PLMN IMS network during the IMS registration process, which is performed by the UE, the P-CSCF existing in the V-PLMN is unable to know where to deliver the SIP REGISTER message, which is received from the UE (i.e., the address of the S-CSCF existing in the H-PLMN is unknown). And, accordingly, the SIP REGISTER message is dropped. More specifically, since the P-CSCF existing in the V-PLMN is incapable of delivering the SIP REGISTER message to the IMS network of the H-PLMN, the corresponding message is dropped.

Eventually, the IMS registration of the UE for the emergency service is failed. And, as a result, a problem may occur in that the UE cannot be provided with the emergency service.

SUMMARY OF THE INVENTION

Technical Objects

Accordingly, one disclosure of this specification is to propose a scheme capable of solving the aforementioned problems.

Technical Solutions

In order to achieve the above-described object of the present invention, a disclosure of this specification proposes a method for performing authentication/registration of a UE that wishes to receive an emergency service when an IMS-NNI does not exist between a H-PLMN and a V-PLMN, and in a situation where a UE roams to a visited network, i.e., V-PLMN, and, after the roaming is processed by a Home Routed (HR) method, the UE receives a desired service by successfully performing its registration to the H-PLMN IMS.

More specifically, in order to achieve the above-described object, a disclosure of this specification provides a method for performing an emergency service by a user equipment (UE) being roamed to a Visited Public Land Mobile Network (V-PLMN). The method may include a step of generating a Packet Data Network (PDN) for the emergency service, when an emergency service is requested. Herein, an indication indicating that a Network to Network Interface (NNI) does not exist between the V-PLMN and a Home PLMN (H-PLMN) may be received during the step of generating the PDN. The method may also include a step of transmitting a REGISTER message for performing an IP Multimedia Subsystem (IMS) registration for the emergency service. Herein, the REGISTER message may include an indication indicating that a NNI does not exist between the V-PLMN and the H-PLMN, and a request type indicating that the requested service type corresponds to an emergency service.

The step of generating a PDN may include a step of transmitting a PDN connection request message to a Mobility Management Entity (MME), and a step of receiving a PDN connection accept message from the MME, wherein the PDN connection accept message includes an indication indicating that a NNI does not exist between the V-PLMN and the H-PLMN.

The REGISTER message may include a Contact header field, wherein an address indicating an emergency is configured.

Additionally, in order to achieve the above-described object, a disclosure of this specification provides a method for processing a request of a user equipment (UE) performed by a Mobility Management Entity (MME) existing in a Visited Public Land Mobile Network (V-PLMN). The method may include the steps of receiving a Packet Data Network (PDN) connection request message for an emergency service from the UE, when the UE is being roamed to the V-PLMN, acquiring subscriber information of the UE, delivering the acquired subscriber information to a Home Subscriber Server (HSS) existing in the V-PLMN, and transmitting a PDN connection accept message to the UE, wherein the PDN connection accept message includes an indication indicating that a Network to Network Interface (NNI) does not exist between the V-PLMN and a Home PLMN (H-PLMN).

The method may further include the steps of responding to the reception of the PDN connection request message and transmitting a session generation request message to a gateway existing in the V-PLMN, and receiving a session generation response message from the gateway.

The subscriber information may be acquired from a HSS existing in the H-PLMN.

The subscriber information may be acquired from an Emergency service Subscriber Server (ESS) existing in the V-PLMN.

When the subscriber information is acquired from the ESS, the subscriber information may correspond to anonymous subscriber information for processing an emergency service of the roaming UE.

Meanwhile, in order to achieve the above-described object, a disclosure of this specification provides a user equipment (UE) for performing an emergency service while being roamed to a Visited Public Land Mobile Network (V-PLMN). The user equipment may include a transceiver, and a processor controlling the transceiver. Herein, the processor may perform generating a Packet Data Network (PDN) for the emergency service, when an emergency service is requested, wherein an indication indicating that a Network to Network Interface (NNI) does not exist between the V-PLMN and a Home PLMN (H-PLMN) is received during the step of generating the PDN, and transmitting a REGISTER message for performing an IP Multimedia Subsystem (IMS) registration for the emergency service. Herein, the REGISTER message may include an indication indicating that a NNI does not exist between the V-PLMN and the H-PLMN, and a request type indicating that the requested service type corresponds to an emergency service.

Furthermore, in order to achieve the above-described object, a disclosure of this specification provides a Mobility Management Entity (MME) for processing a request of a user equipment (UE) being roamed to a Visited Public Land Mobile Network (V-PLMN). The MME may include a transceiver, and a processor controlling the transceiver. Herein, the processor may perform receiving a Packet Data Network (PDN) connection request message for an emergency service from the UE, acquiring subscriber information of the UE, when the UE is being roamed to the V-PLMN, delivering the acquired subscriber information to a Home Subscriber Server (HSS) existing in the V-PLMN, and transmitting a PDN connection accept message to the UE, wherein the PDN connection accept message includes an indication indicating that a Network to Network Interface (NNI) does not exist between the V-PLMN and a Home PLMN (H-PLMN).

Effects of the Invention

According to the disclosure of this specification, the technical problems of the related art may be resolved.

DESCRIPTION OF EXEMPLARY EMBODIMENTS

Figure 1:
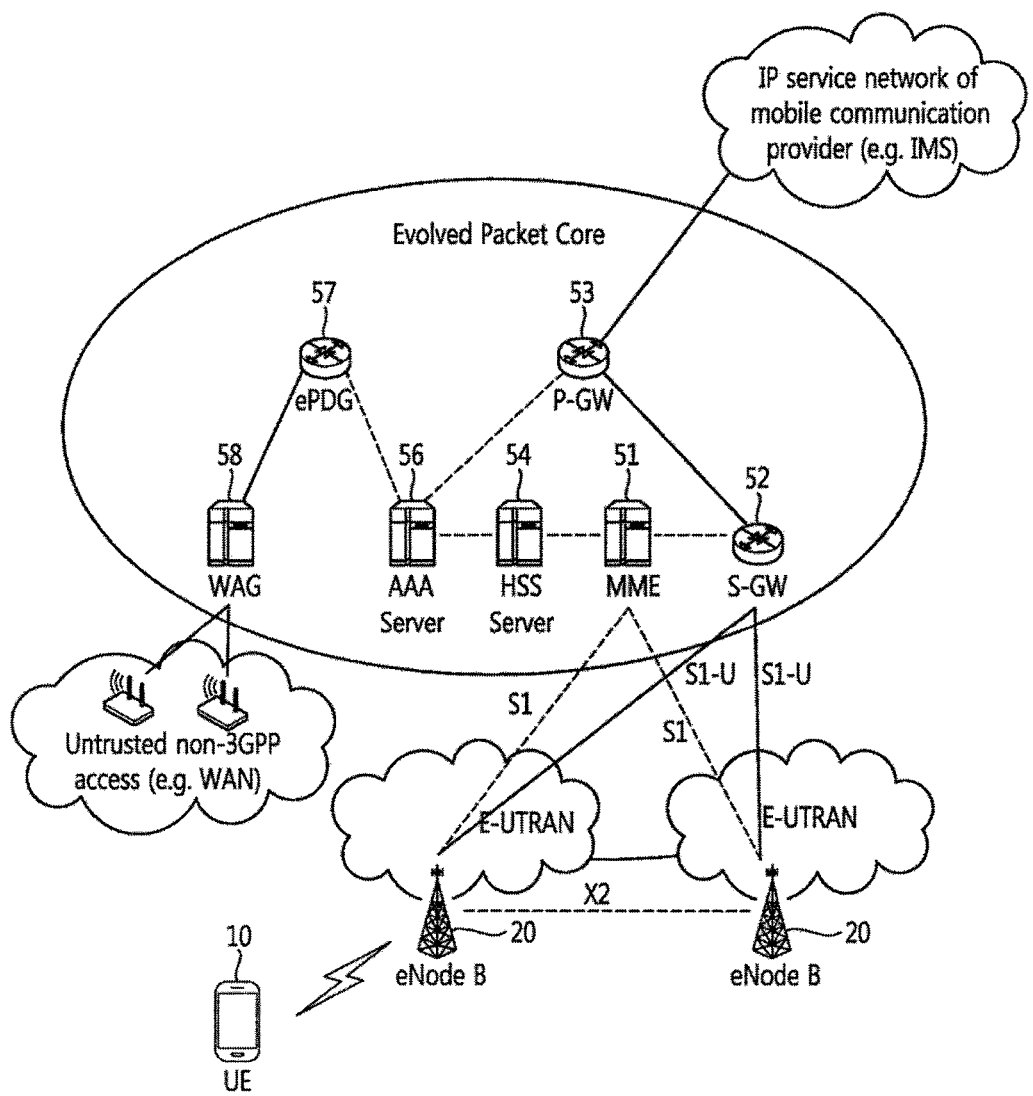
FIG. 1 is a structural diagram of an evolved mobile communication network.
Figure 2:
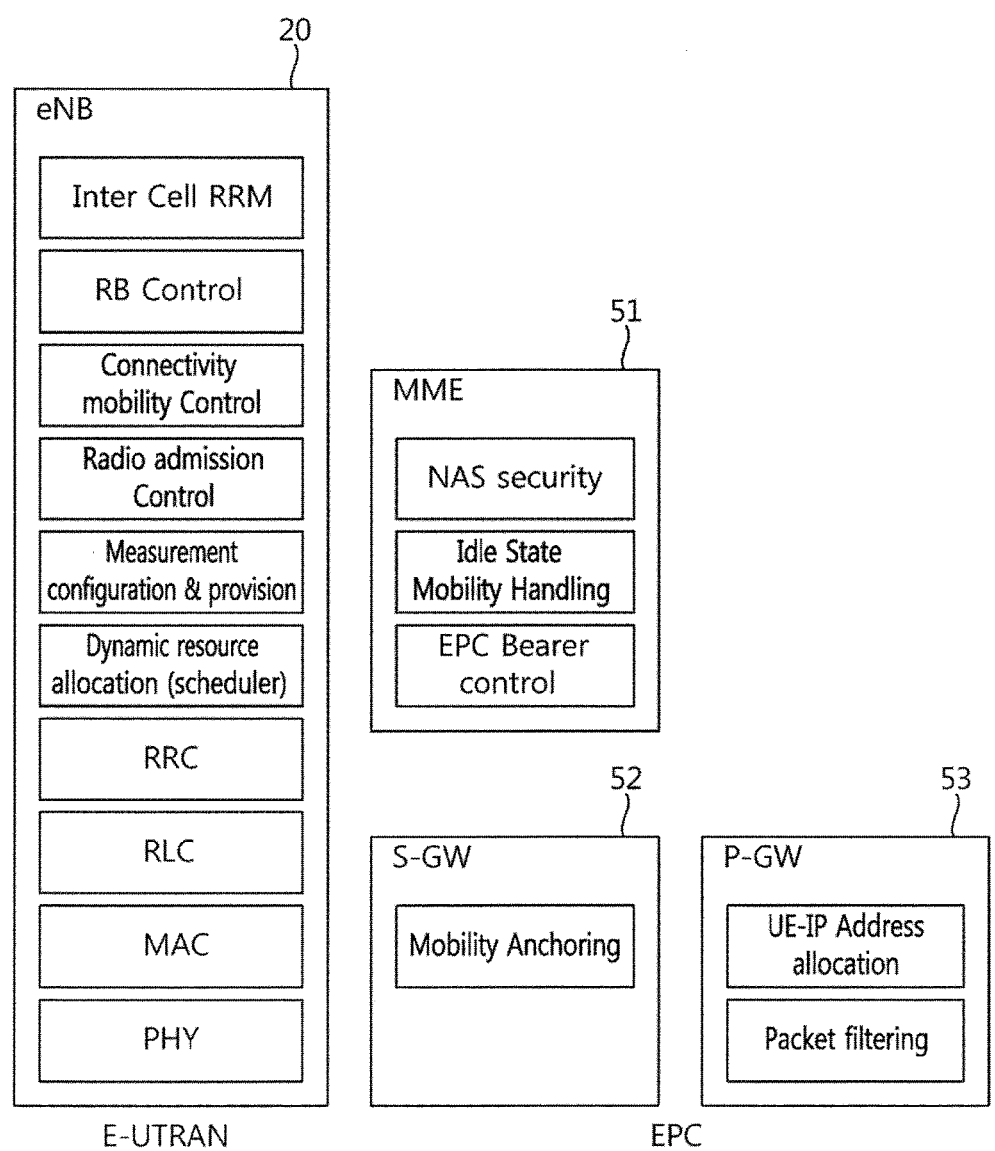
FIG. 2 is an exemplary diagram illustrating architectures of a general E-UTRAN and a general EPC.
Figure 3:
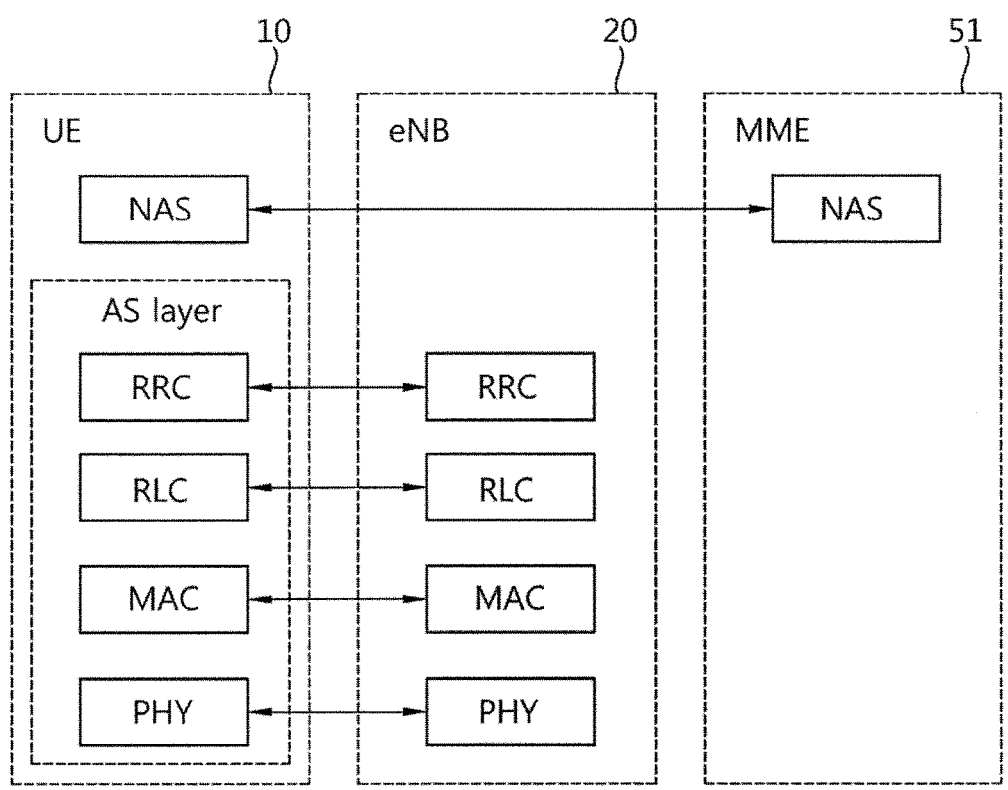
FIG. 3 is an exemplary diagram illustrating a structure of a radio interface protocol on a control plane between UE and eNodeB.
Figure 4:
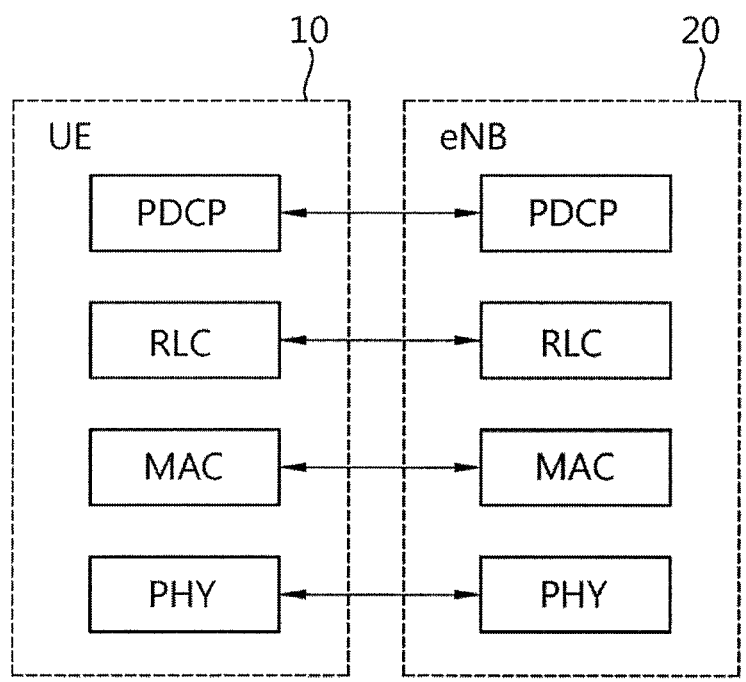
FIG. 4 is another exemplary diagram illustrating a structure of a radio interface protocol on a user plane between the UE and a base station.
Figure 5A:
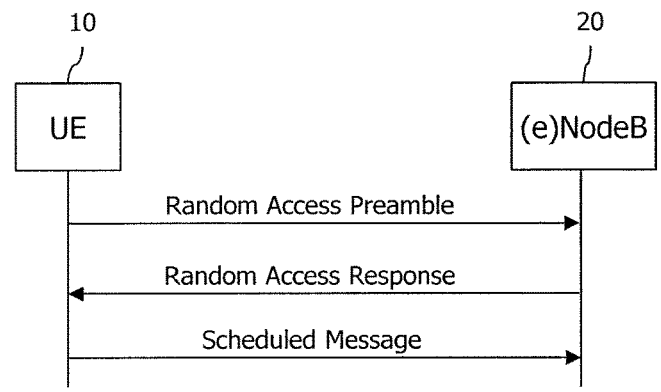
FIG. 5a is a flowchart illustrating a random access process in 3GPP LTE.
Figure 5B:
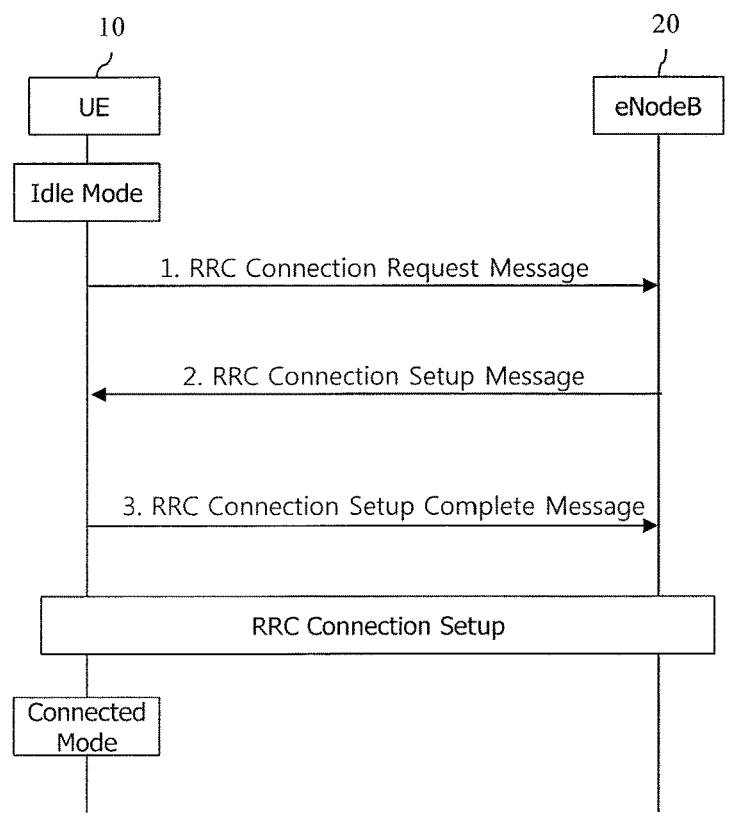
FIG. 5b illustrates a connection process in a radio resource control (RRC) layer.
Figure 6:
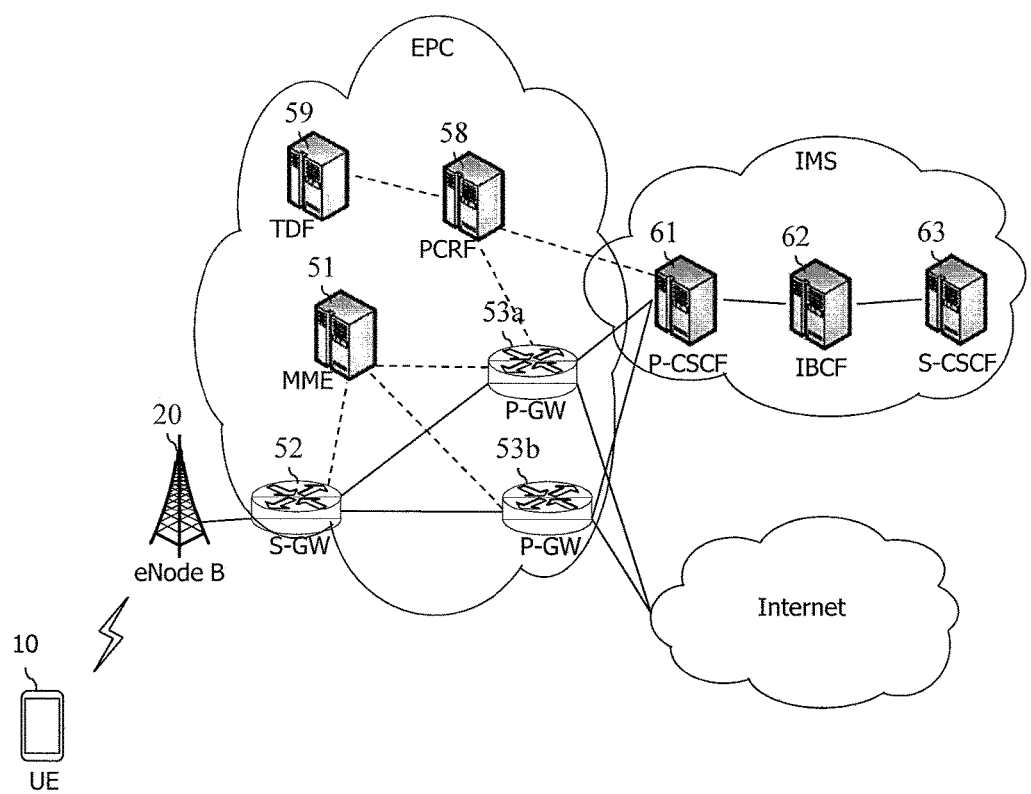
FIG. 6 illustrates a connection between an EPC and an IP Multimedia Subsystem (IMS).
Figure 7:
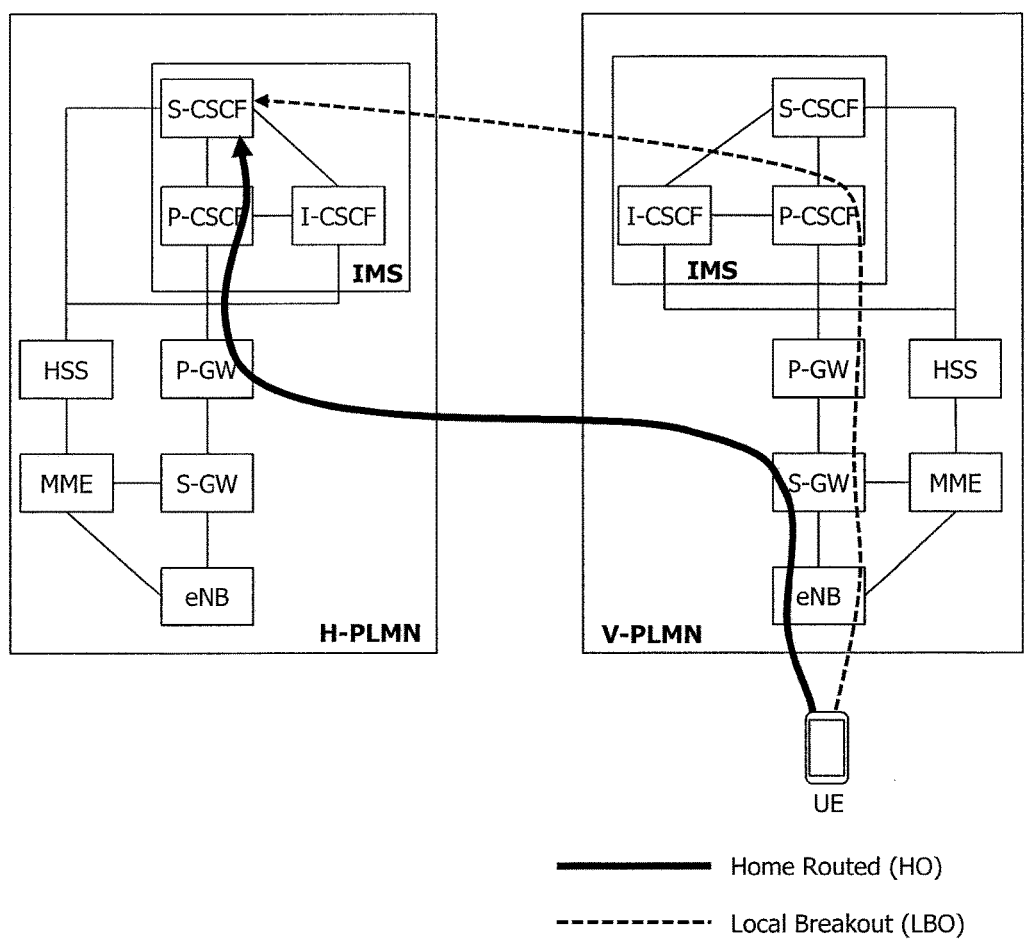
FIG. 7 illustrates an exemplary diagram showing a roaming method of voice over LTE (VoLTE).
Figure 8:
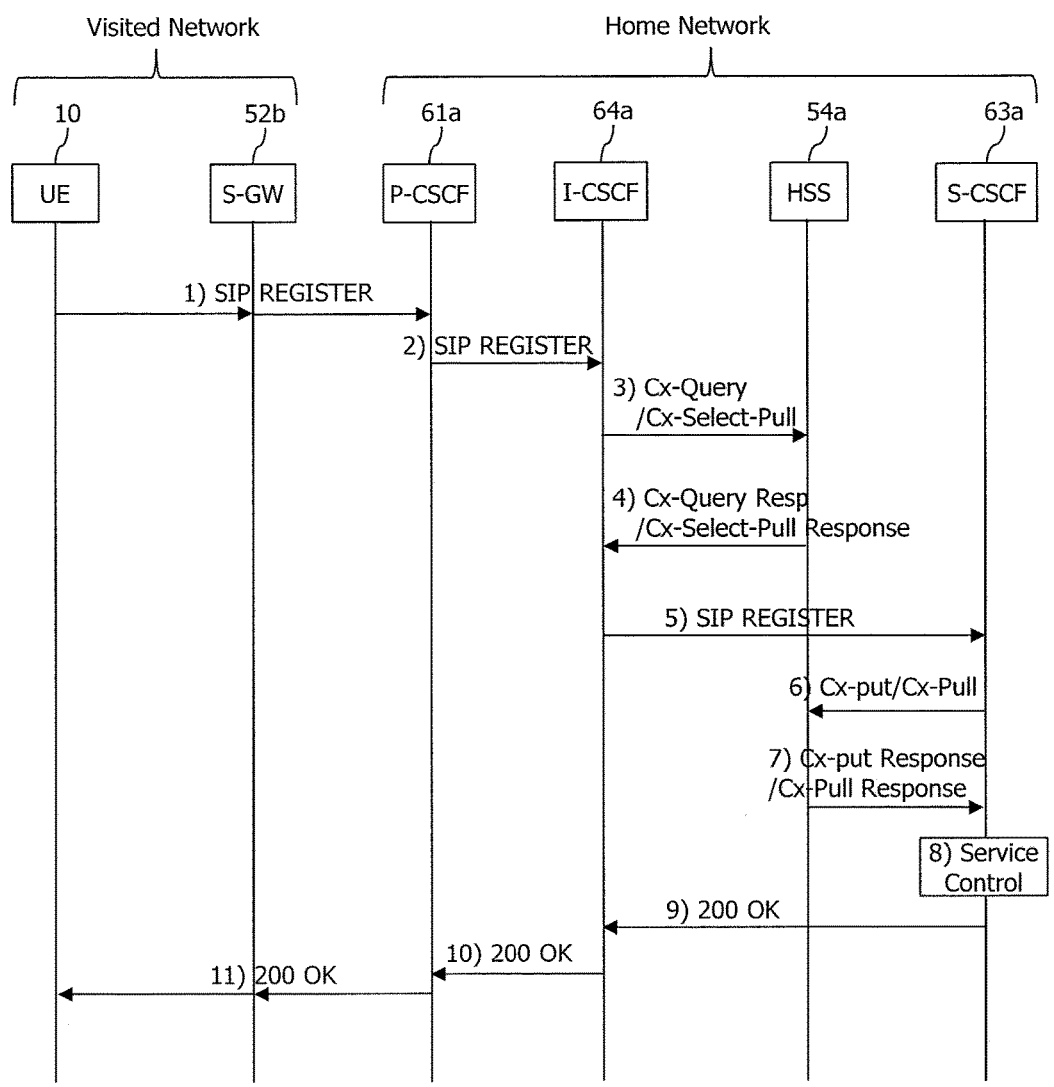
FIG. 8 is an exemplary signal flow chart showing a UE performing IMS registration by using a Home Routed (HR) method while the UE is roamed to a visited network.

The presented invention is described in light of UMTS (Universal Mobile Telecommunication System) and the EPC (Evolved Packet Core), but not limited to such communication systems, and may be rather applicable to all communication systems and methods to which the technical spirit of the presented invention may apply.

The technical terms used herein are used to merely describe specific embodiments and should not be construed as limiting the presented invention. Further, the technical terms used herein should be, unless defined otherwise, interpreted as having meanings generally understood by those skilled in the art but not too broadly or too narrowly. Further, the technical terms used herein, which are determined not to exactly represented the spirit of the invention, should be replaced by or understood by such technical terms as being able to be exactly understood by those skilled in the art. Further, the general terms used herein should be interpreted in the context as defined in the dictionary, but not in an excessively narrowed manner.

Furthermore, the expression of the singular number in the specification includes the meaning of the plural number unless the meaning of the singular number is definitely different from that of the plural number in the context. In the following description, the term 'include' or 'have' may represented the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the presented invention.

It will be understood that when an element or layer is referred to as being "connected to" or "coupled to" another element or layer, it can be directly connected or coupled to the other element or layer or intervening elements or layers may be presented. In contrast, when an element is referred to as being "directly connected to" or "directly coupled to" another element or layer, there are no intervening elements or layers presented.

Hereinafter, exemplary embodiments of the presented invention will be described in greater detail with reference to the accompanying drawings. In describing the presented invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smart phone, a multimedia device, or other portable device or may be a stationary device, such as a PC or a car-mounted device.

Definition of Terms

For better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

An UMTS is an abbreviation of a Universal Mobile Telecommunication System, and it refers to the core network of the 3rd generation mobile communication.

UE/MS is an abbreviation of User Equipment/Mobile Station, and it refers to a terminal device.

An EPS is an abbreviation of an Evolved Packet System, and it refers to a core network supporting a Long Term Evolution (LTE) network and to a network evolved from an UMTS.

A PDN is an abbreviation of a Public Data Network, and it refers to an independent network where a service for providing service is placed.

A PDN connection refers to a connection from UE to a PDN, that is, an association (or connection) between UE represented by an IP address and a PDN represented by an APN.

A PDN-GW is an abbreviation of a Packet Data Network Gateway, and it refers to a network node of an EPS network which performs functions, such as the allocation of a UE IP address, packet screening & filtering, and the collection of charging data.

A Serving gateway (Serving GW) is a network node of an EPS network which performs functions, such as mobility anchor, packet routing, idle mode packet buffering, and triggering an MME to page UE.

A Policy and Charging Rule Function (PCRF): The node of an EPS network which performs a policy decision for dynamically applying QoS and a billing policy that are different for each service flow.

An Access Point Name (APN) is the name of an access point that is managed in a network and provides to UE. That is, an APN is a character string that denotes or identifies a PDN. Requested service or a network (PDN) is accessed via P-GW. An APN is a name (a character string, e.g., 'internet.mnc012.mcc345.gprs') previously defined within a network so that the P-GW can be searched for.

A Tunnel Endpoint Identifier (TEID): The end point ID of a tunnel set between nodes within a network, and it is set for each bearer unit of each UE.

A NodeB is an eNodeB of a UMTS network and installed outdoors. The cell coverage of the NodeB corresponds to a macro cell.

An eNodeB is an eNodeB of an Evolved Packet System (EPS) and is installed outdoors. The cell coverage of the eNodeB corresponds to a macro cell.

An (e)NodeB is a term that denotes a NodeB and an eNodeB.

An MME is an abbreviation of a Mobility Management Entity, and it functions to control each entity within an EPS in order to provide a session and mobility for UE.

A session is a passage for data transmission, and a unit thereof may be a PDN, a bearer, or an IP flow unit. The units may be classified into a unit of the entire target network (i.e., an APN or PDN unit) as defined in 3GPP, a unit (i.e., a bearer unit) classified based on QoS within the entire target network, and a destination IP address unit.

A PDN connection is a connection from UE to a PDN, that is, an association (or connection) between UE represented by an IP address and a PDN represented by an APN. It means a connection between entities (i.e., UE-PDN GW) within a core network so that a session can be formed.

UE context is information about the situation of UE which is used to manage the UE in a network, that is, situation information including an UE ID, mobility (e.g., a current location), and the attributes of a session (e.g., QoS and priority)

NAS (Non-Access-Stratum): A higher stratum of a control plane between a UE and an MME. The NAS supports mobility management, session management, IP address management, etc., between the UE and the network.

RAT: an abbreviation of Radio Access Technology. Means GERAN, UTRAN, E-UTRAN, etc.

Meanwhile, the exemplary embodiments that will hereinafter be proposed may be implemented independently. However, a combination of multiple exemplary embodiments may also be implemented.

<First Solution According to a Disclosure of this Specification>

Figure 9:
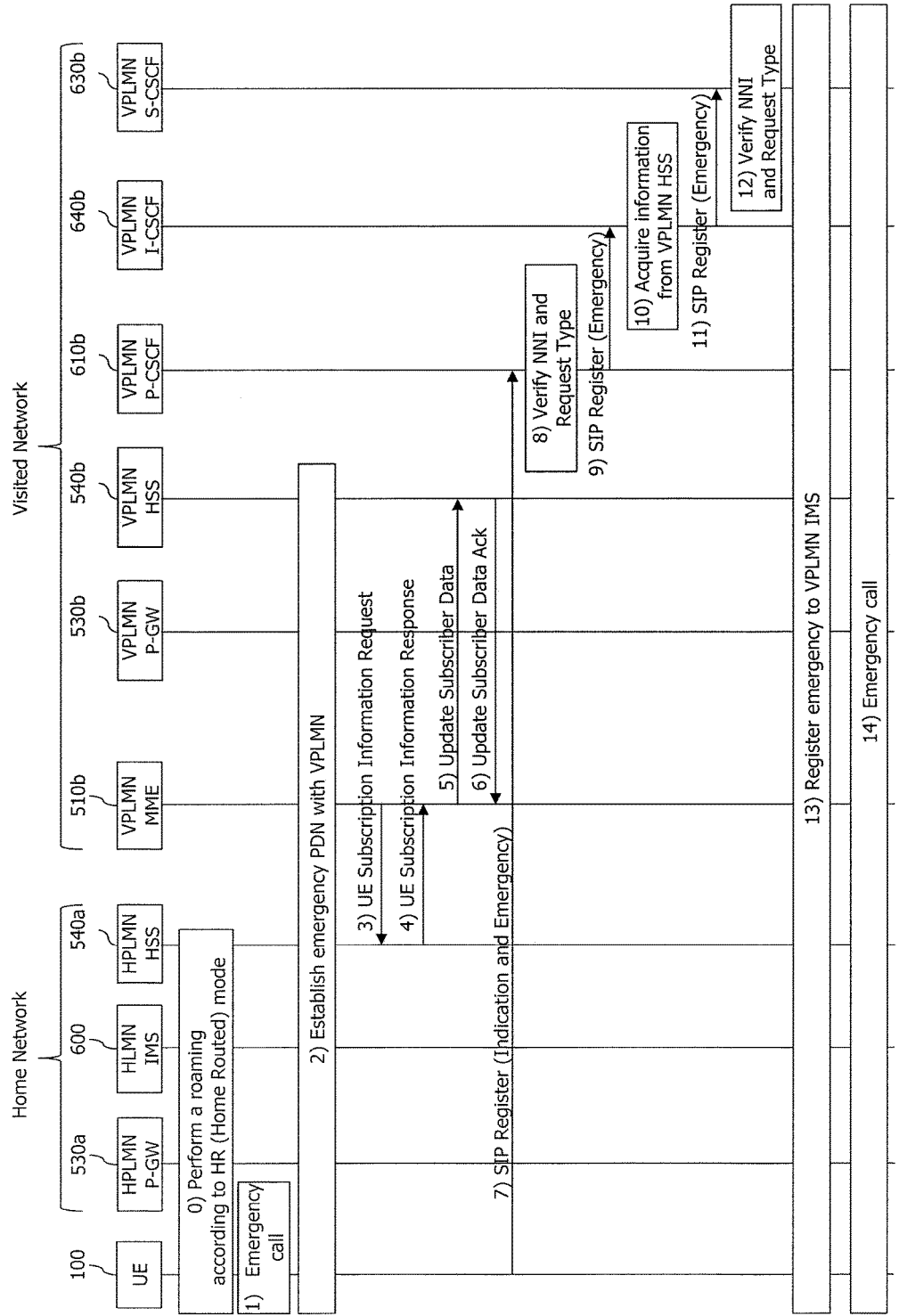
FIG. 9 is a signal flow chart showing a first solution according to a disclosure of this specification.

FIG. 9 is a signal flow chart showing a first solution according to a disclosure of this specification.

Referring to FIG. 9, in a situation where a UE 100 has processed roaming to a visited network, i.e., V-PLMN, by using the HR method, in case the generation of an emergency PDN is requested, an MME existing in the V-PLMN uses an interface with an HSS existing in an H-PLMN (i.e., an S6a interface) so as to acquire the subscriber information of the UE. Then, as shown in FIG. 9, the UE is registered to the IMS existing in the V-PLMN based on the acquired subscriber information of the UE.

Referring to FIG. 9, in the situation where the UE is roamed to the V-PLMN by using the Home Routed (HR) method, when the UE 100 detects an emergency call request from the user, the UE 100 generates an emergency PDN. The emergency PDN is generated in the V-PLMN. During this process, even though the MME 510*b* existing in the V-PLMN recognizes that the UE 100 is generating the emergency PDN, when the MME 510*b* verifies that an NNI does not exist between the H-PLMN and the V-PLMN, the MME 510*b* acquires the subscriber information of the UE that is required for the IMS registration and the information for the authentication of the UE 100 from the HSS 540*a* existing in the H-PLMN. Also, the MME 510*b* requests the HSS 540*b* existing in the V-PLMN to temporarily store the acquired information. The MME 510*b* existing in the V-PLMN may include the information indicating that the NNI does not exist in a PDN request ACCEPT message and may deliver the corresponding message to the UE. After generating the PDN, the UE recognizes that the NNI does not exist (or that the NNI is not included) and includes the indication indicating that the NNI does not exist in the SIP-based REGISTER message, and, then, the UE transmits the corresponding message. When the P-CSCF 610*b* existing in the V-PLMN receives the SIP REGISTER message, the P-CSCF 610*b* verifies the indication indicating that the NNI does not exist or directly verifies that the NNI does not exist. Then, only in the case where the REGISTER message that is received from the UE requests a registration for an emergency service, the P-CSCF 610*b* delivers the REGISTER message to the I-CSCF 640*b* of the V-PLMN. The I-CSCF 640*b* delivers the REGISTER message to the S-CSCF 630*b* existing in the V-PLMN based on the information received from the HSS 540*b* existing in the V-PLMN. In case the S-CSCF 630*b* recognizes that the UE has performed roaming without the NNI, after verifying the indication on the presence or absence of the NNI included in the REGISTER message, or after directly verifying the absence of the NNI, the S-CSCF 630*b* receives the corresponding information from the HSS 540*b* existing in the V-PLMN and accepts the registration of the UE 100. After the registration of the UE 100 is successfully completed, the emergency call is initiated.

Each process step of the above-described procedure will hereinafter be described in detail.

1) First, the UE 100, which is roamed to the visited network, i.e., V-PLMN, detects a request for an Emergency Call that is made by the user.

2) Accordingly, the UE 100 performs generating an emergency PDN. More specifically, in order to generate the emergency PDN, the UE 100 transmits a PDN connection request message to the MME 510*b* existing in the V-PLMN. The MME 510*b* transmits a session generation request message to the P-GW 530*b* existing in the V-PLMN, and, then, the P-GW 530*b* delivers a session generation response message to the MME 510*b*. Accordingly, the MME 510*b* transmits a PDN connection accept message to the UE 100. Thus, the emergency PDN is generated with the P-GW 530*b* existing in the V-PLMN. However, the MME 510*b* existing the V-PLMN may include information (or indication) indicating that the NNI does not exist in the PDN connection accept message and may deliver the corresponding message to the UE.

3~4) During the emergency PDN generation process, the MME 510*b* existing in the V-PLMN requests subscriber information of the UE to a home network of the UE, i.e., the HSS 540*a* existing in the H-PLMN. Accordingly, the HSS 540*a* existing in the H-PLMN delivers the subscriber information of the UE to the MME 510*b* existing in the V-PLMN. If the MME 510*b* existing in the V-PLMN already has the subscriber information of the corresponding UE, processes 3-4) may be omitted.

Also, the above-described processes 3-4) are performed only in a case where the IMS NNI does not exist between the H-PLMN and the V-PLMN.

5~6) The MME 510*b* existing in the V-PLMN delivers the acquired subscriber information of the UE to the HSS 540*b* existing in the V-PLMN.

7) Meanwhile, in order to perform the IMS registration for an emergency service, the UE 100 delivers the SIP based REGISTER message to the P-CSCF 610*b* existing in the V-PLMN. At this point, a Request Type field included in the SIP based REGISTER message is set to an Emergency type. Also, information (or indication) indicating that the NNI does not exist may be included in the SIP based REGISTER message.

8) The P-CSCF 610*b* existing in the V-PLMN determines whether or not the Request Type field included in the SIP based REGISTER message is set to the Emergency type. Alternatively, the P-CSCF 610*b* determines whether or not a Contact header field included in the REGISTER message is set to an "sos" SIP URI parameter.

Additionally, the P-CSCF 610*b* determines whether or not the NNI exists between the H-PLMN and the V-PLMN based upon the following cases.

i. While the emergency PDN is established, in case the MME 510*b* existing in the V-PLMN has delivered an indication indicating that the NNI does not exist between the H-PLMN and the V-PLMN to the UE.

ii. In case the UE has received the indication, and in case the UE includes the corresponding information in the SIP based REGISTER message and transmits the REGISTER message.

9) Based on the determined result, the P-CSCF 610*b* existing in the V-PLMN does not deliver the SIP based REGISTER message to the S-CSCF existing in the H-PLMN and delivers the corresponding message to the I-CSCF 640*b* existing in the V-PLMN.

10) The I-CSCF 640*b* requests the HSS 540*b* existing in the V-PLMN to verify the registration status of the UE, and, accordingly, the HSS 540*b* delivers the subscriber information to the I-CSCF 640*b* based on the stored subscriber information.

11) The I-CSCF 640*b* determines where to deliver the SIP based REGISTER message based on the subscriber information, which is acquired from the HSS 540*b*. At this point, according to the conventional method, since the subscriber information of the UE does not exist in the HSS 540*b* existing in the V-PLMN, the I-CSCF 640*b* will disregard the REGISTER message transmitted from the UE. However, according to first solution, since the subscriber information of the UE is acquired from the HSS 540*b* existing in the V-PLMN, the I-CSCF 640*b* delivers the SIP based REGISTER message to the S-CSCF 630*b* existing in the V-PLMN based on the acquired subscriber information.

12) The S-CSCF 630*b* existing in the V-PLMN acquires the subscriber information of the UE from the HSS 540*b* and accepts the registration of the UE based on the acquired subscriber information.

At this point, the S-CSCF 630*b* existing in the V-PLMN verifies the following details.

i. By verifying the SIP based REGISTER message, the S-CSCF 630*b* verifies whether the UE is being roamed while the NNI does not exist between the H-PLMN and the V-PLMN, or whether the UE is being roamed while the NNI exists between the H-PLMN and the V-PLMN.

ii. By receiving an indication on the NNI from the P-CSCF, the S-CSCF 630*b* verifies whether the UE is being roamed while the NNI does not exist between the H-PLMN and the V-PLMN, or whether the UE is being roamed while the NNI exists between the H-PLMN and the V-PLMN.

13-14) When the IMS registration for the emergency service is completed in the V-PLMN, the UE is capable of performing the Emergency call.

Meanwhile, the subscriber information of the UE, which is stored in the HSS 540*b* existing in the V-PLMN, is deleted in the following cases.

i. In case a timer for the deletion of the subscriber information of the UE exists, the subscriber information of the UE is deleted when the timer is expired. Herein, the timer is set to a value that is related to the registration time.

ii. When the MME notifies a cancellation of the emergency PDN to the HSS, the subscriber information of the UE is deleted.

<Second Solution According to a Disclosure of this Specification>

A second solution relates to UE authentication/registration using Anonymous Emergency service Roaming.

Figure 10:
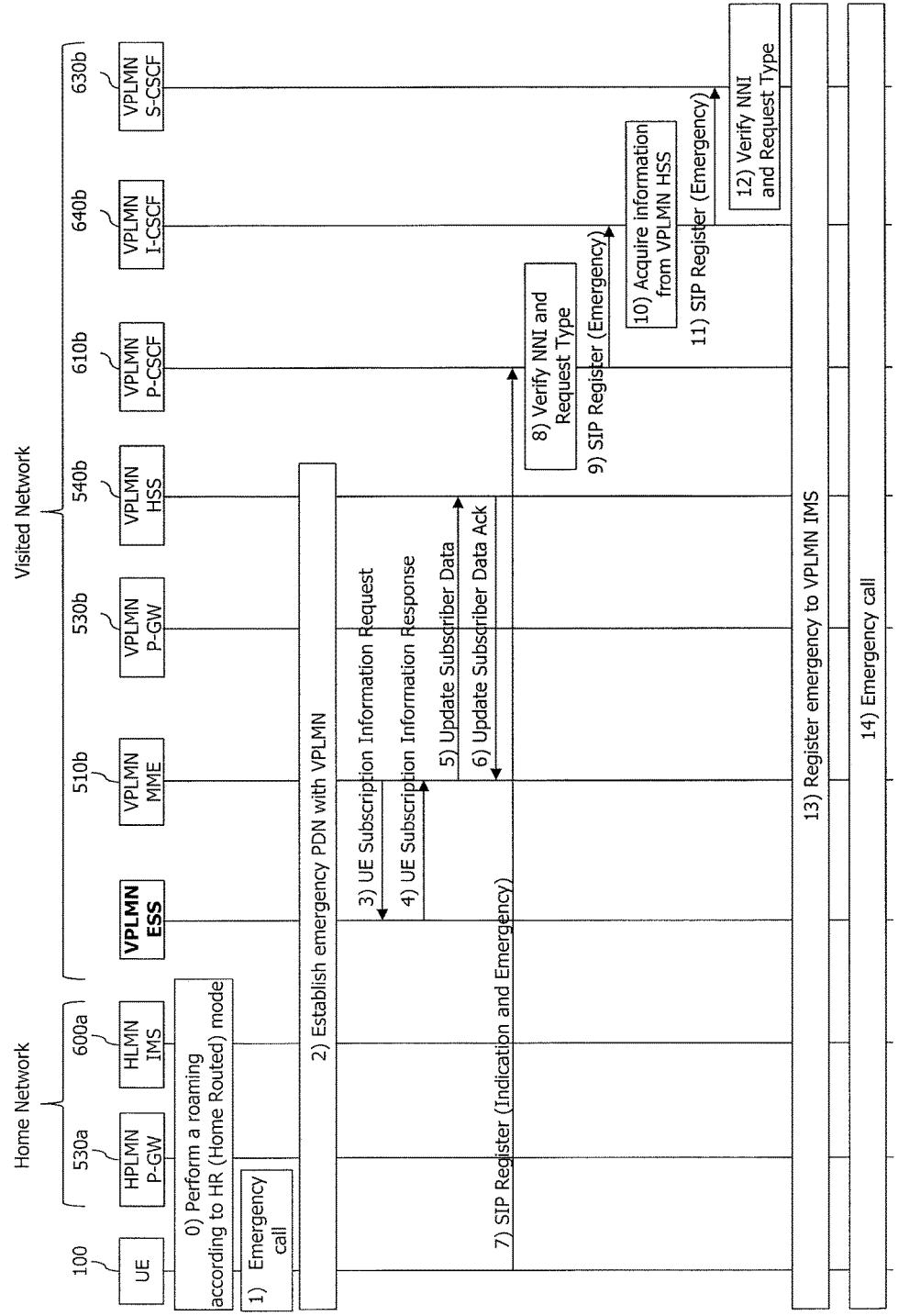
FIG. 10 is a signal flow chart showing a second solution according to a disclosure of this specification.

FIG. 10 is a signal flow chart showing a second solution according to a disclosure of this specification.

Referring to FIG. 10, the Emergency service Subscriber Server (ESS) existing in the V-PLMN has authentication information for an emergency service for a roaming UE. Therefore, in a situation where a UE 100 has processed roaming to a visited network, i.e., V-PLMN, by using the HR method, in case the generation of an emergency PDN is requested, an MME existing in the V-PLMN acquires the subscriber information of the UE from the ESS existing in the V-PLMN. Then, the UE is registered to the IMS existing in the V-PLMN based on the acquired subscriber information of the UE.

1-2) These processes are the same as the processes 1-2) of FIG. 9.

3-4) The MME 510*b* existing in the V-PLMN requests subscriber information for the registration of the UE to the Emergency service Subscriber Server (ESS) existing in the V-PLMN. Accordingly, the ESS existing in the V-PLMN delivers anonymous subscriber information for the emergency service of the roaming UE to the MME 510*b* existing in the V-PLMN. If the MME 510*b* existing in the V-PLMN already has the subscriber information of the UE, the processes 3-4) may be omitted.

The subscriber information of the UE that is included in the ESS is stored and acquired in accordance with a service level agreement between the H-PLMN and the V-PLMN.

The above-described processes 3-4) are performed only in a case where the IMS NNI does not exist between the H-PLMN and the V-PLMN.

5~6) The MME 510*b* existing in the V-PLMN delivers the acquired subscriber information of the UE to the HSS 540*b* existing in the V-PLMN.

7-9) These processes are the same as the processes 7-9) of FIG. 9.

10) The I-CSCF 640*b* requests the HSS 540*b* existing in the V-PLMN to verify the registration status of the UE. And, accordingly, the HSS 540*b* delivers the subscriber information to the I-CSCF 640*b* based on the stored subscriber information.

However, in case the above-described processes 3-4) are not performed, the I-CSCF 640*b* queries the registration status to the ESS.

11) This process is the same as the process 11) of FIG. 9.

12) The S-CSCF 630*b* existing in the V-PLMN acquires the subscriber information of the UE from the HSS 540*b* and, then, accepts the registration of the UE based on the acquired subscriber information.

However, in case the above-described processes 3-4) are not performed, the S-CSCF 630*b* performs the registration of the UE based on the subscriber information, which is acquired from the ESS.

At this point, the S-CSCF 630*b* existing in the V-PLMN verifies the following details.

i. By verifying the SIP based REGISTER message, the S-CSCF 630*b* verifies whether the UE is being roamed while the NNI does not exist between the H-PLMN and the V-PLMN, or whether the UE is being roamed while the NNI exists between the H-PLMN and the V-PLMN.

ii. By receiving an indication on the NNI from the P-CSCF, the S-CSCF 630*b* verifies whether the UE is being roamed while the NNI does not exist between the H-PLMN and the V-PLMN, or whether the UE is being roamed while the NNI exists between the H-PLMN and the V-PLMN.

13-14) When the IMS registration for the emergency service is completed in the V-PLMN, the UE is capable of performing the Emergency call.

<Third Solution According to a Disclosure of this Specification>

A third solution relates to UE authentication/registration using Local authentication information. This solution will be described in detail as presented below.

Processes 1) to 9) are the same as processes 1) to 9) of FIG. 9.

10) The I-CSCF 640*b* existing in the V-PLMN queries user registration status information to the HSS 540*b* existing in the V-PLMN. The HSS 540*b* existing in the V-PLMN responds to the I-CSCF 640*b* based on local or temporary authentication information, such as roaming agreement, local policies, and so on.

11) Thereafter, the I-CSCF 640*b* determines where to deliver the SIP based REGISTER message received from the UE based on the information, which is acquired from the HSS 540*b*. Then, according to the determined result, the I-CSCF 640*b* may deliver the REGISTER message to the S-CSCF 630*b* existing in the V-PLMN.

12) The S-CSCF 630*b* acquires local or temporary authentication information from the HSS 540*b* existing in the V-PLMN and, then, accepts the registration of the UE based on the acquired information.

<Detailed Description of the Subscriber Information of the UE>

In order to authenticate/register the UE in the IMS, subscriber information of the UE is required. This information corresponds to AVP information that is required for a Multimedia-Auth-Answer (MAA) Command, a Server-Assignment-Answer (SAA) Command, and so on. Such information not only include the subscriber information but also includes an Authentication Vector (AV), and so on, that are required for the registration to the IMS.

Therefore, as shown in the processes 3) to 6) of FIG. 9, the MME 510*b* existing in the V-PLMN requests in advance the AV, which is required for the authentication of the UE, to the HSS 540*a* existing in the H-PLMN instead of the S-CSCF 630*b*. Then, after acquiring the requested AV, the MME 510*b* stores the acquired AV in the HSS 540*b* existing in the V-PLMN. In order to request the above-described AV value, the MME 510*b* is required to deliver IMSI, SN ID, and Network type (CS/PS) information of the UE to the HSS 540*a* existing in the H-PLMN. In accordance with the request made by the MME 510*b*, the HSS 540*a* existing in the H-PLMN generates an SQN and a RAND by using a Key generating algorithm. Then, after generating the AV based on the generated SQN and RAND, the HSS 540*a* delivers the generated AV to the MME 510*b*. The AV is configured of RAND, AUTN, CK, IK, and so on.

The MME 510*b* stores the AV, which is acquired from the HSS 540*a* of the H-PLMN, in the HSS 540*b* or ESS of the V-PLMN, or the MME 510*b* stores the AV in the HSS 540*b* of the V-PLMN in the form of local/temporary authentication information based on the roaming agreement, local policies, and so on. At this point, the local/temporary authentication information may correspond to information associated with a specific PLMN or UE, or the local/temporary authentication information may be stored regardless of the PLMN or UE. Alternatively, the local/temporary authentication information may also be determined in accordance with an emergency phone number used by the UE, location information of the UE, and so on.

The description presented above may be implemented in the form of hardware. This will hereinafter be described in detail with reference to FIG. 11.

Figure 11:
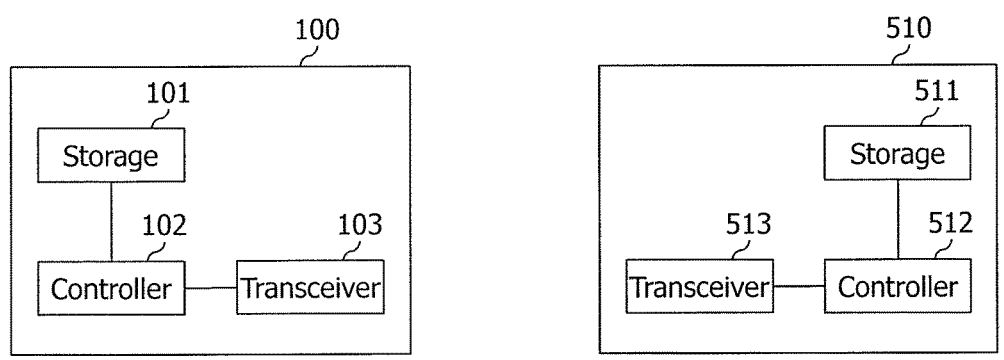
FIG. 11 is a block diagram showing the configuration of a UE 100 and a network node according to an exemplary embodiment of the present invention.

FIG. 11 is a block diagram showing the configuration of a UE 100 and a network node according to an exemplary embodiment of the present invention.

As shown in FIG. 11, the UE 100 includes a storage means 101, a controller 102, and a transceiver 103. And, the network node may correspond to the MME 510. The network node includes a storage means 511, a controller 512, and a transceiver 513.

The storage means store the above described methods.

The controllers control the respective storage means and transceivers. More specifically, the controllers respectively perform the methods stored in the storage means. And, the controllers transmit the above-described signals through the respective transceivers.

Although an exemplary description of the present invention has been presented above according to a preferred embodiment of the present invention, the scope and spirit of the present invention will not be limited only to the particular embodiment presented herein. Thus, it is intended that this specification covers the modifications, variations, and enhancements of this invention provided they come within the scope of the appended claims and their equivalents.

What is claimed is:

1. A method of performing an emergency service, the method performed by a user equipment (UE) being roamed to a Visited Public Land Mobile Network (V-PLMN) and comprising:
   when an emergency service is requested, transmitting, by the UE, a Packet Data Network (PDN) connection request message for the emergency service to a Mobility Management Entity (MME) of the V-PLMN;
   receiving, by the UE, a PDN connection accept message from the MME of the V-PLMN,
   wherein the PDN connection accept message includes Network to Network Interface (NNI) information representing that a NNI does not exist between an Internet Protocol (IP) Multimedia Subsystem (IMS) network of the V-PLMN and an IMS network of a Home PLMN (H-PLMN); and
   transmitting, by the UE, a REGISTER message for performing an IMS registration for the emergency service to a Proxy Call Session Control Function (P-CSCF) of the V-PLMN,
   wherein the REGISTER message includes the NNI information that the NNI does not exist between the IMS network of the V-PLMN and the IMS network of the H-PLMN, and request type information representing that the requested service type is the emergency service, and
   wherein the request type information and the NNI information are used by the P-CSCF of the V-PLMN to determine whether to transmit the REGISTER message to an Interrogating-CSCF (I-CSCF) of the V-PLMN.

2. The method of claim 1, wherein the REGISTER message includes a Contact header field, and
   wherein an address indicating an emergency is configured.

3. A method for processing a request of a user equipment (UE) performed by a Mobility Management Entity (MME) of a Visited Public Land Mobile Network (V-PLMN), the method comprising:
   receiving, by the MME a Packet Data Network (PDN) connection request message for an emergency service from the UE;
   determining, by the MME, whether a Network to Network Interface (NNI) between an Internet Protocol (IP) Multimedia Subsystem (IMS) network of the V-PLMN and an IMS network of a Home PLMN (H-PLMN) exists;
   when the UE is being roamed to the V-PLMN and when the NNI between the IMS network of the V-PLMN and the IMS network of the H-PLMN is determined to not exist, acquiring subscriber information of the UE from a Home Subscriber Server (HSS) of the H-PLMN;
   transmitting, by the MME, the acquired subscriber information to a HHS of the V-PLMN; and
   transmitting, by the MME, a PDN connection accept message to the UE,
   wherein when the NNI between the IMS network of the V-PLMN and the IMS network of the H-PLMN is determined to not exist, the PDN connection accept message includes NNI information representing that the NNI does not exist between the IMS network of the V-PLMN and the IMS network of the H-PLMN, and
   wherein the NNI information is used by the UE to transmit a REGISTER message for performing an IMS registration for the emergency service to a Proxy Call Session Control Function (P-CSCF) of the V-PLMN.

4. The method of claim 3, further comprising:
   transmitting a session generation request message to a gateway of the V-PLMN when the PDN connection request message is received from the UE; and
   receiving a session generation response message from the gateway.

5. The method of claim 3, wherein the subscriber information is acquired from an Emergency service Subscriber Server (ESS) existing of the V-PLMN.

6. The method of claim 5, wherein, in case the subscriber information is acquired from the ESS, the subscriber information includes anonymous subscriber information for processing an emergency service of the roaming UE.

7. A user equipment (UE) for performing an emergency service while being roamed to a Visited Public Land Mobile Network (V-PLMN), the UE comprising:
   a transceiver; and
   a processor operatively connected to the transceiver,
   wherein the processor is configured to:
      when an emergency service is requested, control the transceiver to transmit a Packet Data Network (PDN) connection request message for the emergency service to a Mobility Management Entity (MME) of the V-PLMN:
      control the transceiver to receive a PDN connection accept message from the MME of the V-PLMN,
      wherein the PDN connection accept message includes Network to Network Interface (NNI) information representing that a NNI does not exist between an Internet Protocol (IP) Multimedia Subsystem (IMS) network of the V-PLMN and an IMS network of a Home PLMN (H-PLMN); and control the transceiver to transmit a REGISTER message for performing an IMS registration for the emergency service to a Proxy Call Session Control Function (P-CSCF) of the V-PLMN,
wherein the REGISTER message includes the NNI information representing that the NNI does not exist between the IMS network of the V-PLMN and the IMS network of the H-PLMN, and request type information representing that the requested service type is the emergency service, and
wherein the request type information and the NNI information are used by the P-CSCF of the V-PLMN to determine whether to transmit the REGISTER message to an Interrogating-CSCF (I-CSCF) of the V-PLMN.

8. The UE of claim 7, wherein the REGISTER message includes a Contact header field, and
wherein an address indicating an emergency is configured.

9. A Mobility Management Entity (MME) for processing a request of a user equipment (UE) being roamed to a Visited Public Land Mobile Network (V-PLMN), the MME comprising:
a transceiver; and
a processor operatively connected to the transceiver, wherein the processor is configured to:
control the transceiver to receive a Packet Data Network (PDN) connection request message for an emergency service from the UE;
determine whether a Network to Network Interface (NNI) between an Internet Protocol (IP) Multimedia Subsystem (IMS) network of the V-PLMN and an IMS network of a Home PLMN (H-PLMN) exists;
when the UE is being roamed to the V-PLMN and when the NNI between the IMS network of the V-PLMN and the IMS network of the H-PLMN is determined to not exist, control the transceiver to acquire subscriber information of the UE from a Home Subscriber Server (HSS) of the H-PLMN;
control the transceiver to transmit the acquired subscriber information to a HSS of the V-PLMN; and
control the transceiver to transmit a PDN connection accept message to the UE,
wherein when the NNI between the IMS network of the V-PLMN and the IMS network of the H-PLMN is determined to not exist, the PDN connection accept message includes NNI information representing that the NNI does not exist between the IMS network of the V-PLMN and the IMS network of the H-PLMN, and
wherein the information is used by the UE to transmit a REGISTER message for performing an IMS registration for the emergency service to a Proxy Call Session Control Function (P-CSCF) of the V-PLMN.

10. The MME of claim 9, wherein the subscriber information is acquired from an Emergency service Subscriber Server (ESS) of the V-PLMN.

11. The MME of claim 10, wherein, when the subscriber information is acquired from the ESS, the subscriber information includes anonymous subscriber information for processing an emergency service of the roaming UE.

* * * * *